March 9, 1943.   L. F. HAMMAND   2,313,197
TOGGLE JOINT
Original Filed Nov. 18, 1941
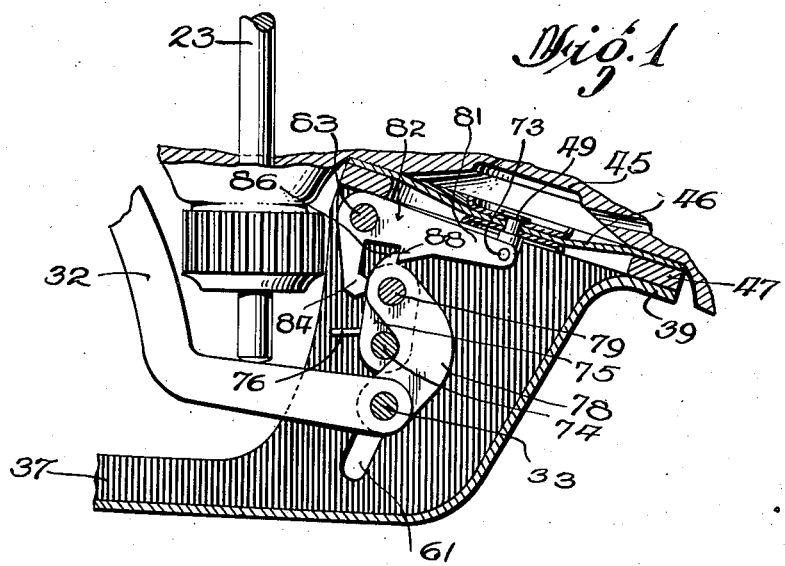
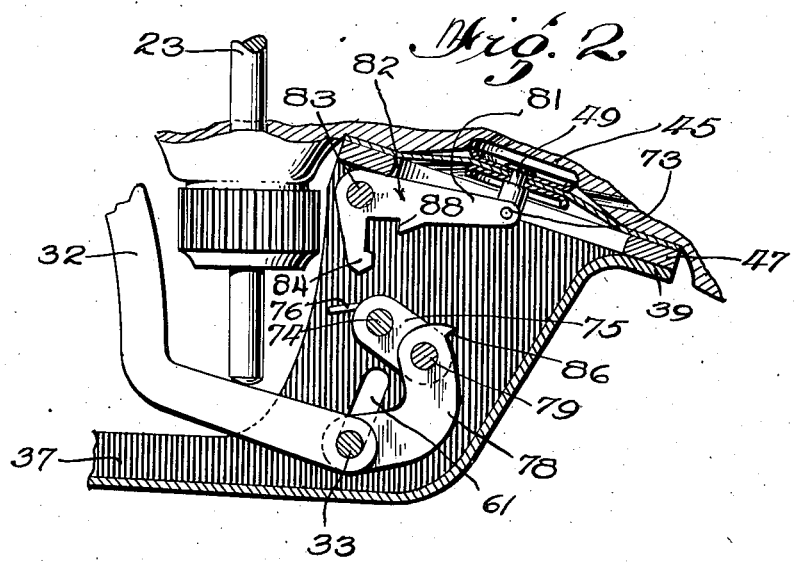
Inventor
L. F. Hammand
By Rob't D. Williams Jr.
Attorney Patented Mar. 9, 1943

2,313,197

UNITED STATES PATENT OFFICE 2,313,197

TOGGLE JOINT

Lowell F. Hammand, Washington, D. C.

Original application November 18, 1941, Serial No. 419,524. Divided and this application March 23, 1942, Serial No. 435,859

10 Claims. (Cl. 74—2)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to toggle joints and particularly to toggle joints arranged to act as release devices. The general aim of the invention is to provide a simple and novel arrangement of parts whereby relatively great forces may be secured against accidental release, yet positively released in response to actuating forces of extremely small magnitude.

This application is a division of application Serial No. 419,524, filed November 18, 1941.

Ordinarily, in a toggle joint arranged to act as a release device, the inherent friction of the pivots of the toggle will increase in approximate direct ratio to the degree of force acting on the links of the toggle so that a much larger force will be required to release the toggle when under heavy load than when under lighter pressure.

In many types of mechanisms it is desirable to provide a simple type of toggle structure arranged to sustain great weight or heavy spring pressure and yet so designed and constructed that it is capable of positive and unfailing release operation in response to a very small force.

The toggle joint comprising the subject matter of the present invention is shown and described in connection with a gasoline dispensing nozzle and is associated with the nozzle in such a manner that the heavy load of the valve actuating spring may be positively controlled by slight fluctuations in atmospheric pressure in a diaphragm control system, and while such an arrangement is well adapted to illustrate the utility of and the necessity for a toggle device as disclosed in this application, it should be understood that the nozzle structure is described by way of illustration rather than by way of limitation and that the teachings of the present invention are equally applicable throughout the entire field of mechanics and in connection with any device having a heavy load to be released by comparatively minute forces.

The primary object of the invention is to provide a novel and improved mechanical movement constituting a toggle joint adapted to maintain itself against a relatively great load, and to release in response to forces of extremely small magnitude.

A further object of the invention is to provide a mechanical movement comprising a latching structure adapted to support a relatively great load and to be positively released by a force of minor magnitude, the structure including a toggle joint arranged to assume a "critical" position such that the toggle may be broken by a very minute force, together with the combination of a release latch to prevent accidental release and toggle actuator, and means whereby the toggle joint may be concurrently unlatched and actively urged toward released position.

A still further object of the invention is to provide a toggle-joint latching device including a relatively few parts of rugged construction and simple mechanical operation and adapted to economical methods of manufacture.

Referring now more particularly to the drawing,

Fig. 1 is a fragmental longitudinal sectional view of a gasoline dispensing nozzle having a toggle joint release device constructed in accordance with the teachings of the present disclosure, and Fig. 2 is a similar view, the parts being drawn in released position.

The nozzle structure includes a valve body 16 provided with a valve port arranged to be closed by a valve having a valve stem 24 arranged to extend exteriorly of the valve body 10, so that the lower extremity of the valve stem will be outside of the valve body and adapted for manual actuation.

The valve is normally forced into firm engagement with the valve seat by a relatively heavy coil compression spring (not shown).

It is contemplated that the valve is to be opened manually and to this end a valve operating lever 32 is pivoted on a supporting pivot 33 positioned somewhat forwardly of the lower extremity of the valve stem 24. The valve operating lever 32 is offset so that the handle portion remote from the pivot 33 will lie substantially parallel with the handle portion of the valve body, so that the operator may grasp the nozzle in one hand and open the valve by drawing the lever 32 toward the valve body. The actuating lever 32 is protected against accidental opening or damage by a lever guard 37 secured to the end of the nozzle structure 10 by any convenient means, as by the flange 39. The forward portion of the handle guard 37 is provided with a pair of relatively wide side walls spaced apart from each other to define a cavity in the forward portion of the valve guard in front of the valve stem 24 to house the toggle joint release.

The valve body is provided with a rarified air chamber 45 over which a flexible fabric diaphragm 46 is clamped by a flange 47. The diaphragm 46 is circular in shape so that it entirely closes the lower side of the aperture 45. It is provided with a pair of center plates 48 to reinforce the fabric diaphragm and to provide a mounting for a post 49 to which the toggle release mechanism is attached.

The rarified air cavity 45 is interconnected with a venturi and with suction and control ports so that the toggle release device comprising the subject matter of the present application will control the operation of the valve 24 in response to fluctuations of pressure within the cavity 45.

This is accomplished by the novel and improved toggle release mechanism for the supporting pivot 33 on which the valve control handle 32 is mounted, so that the relatively small atmospheric force actuating the shut-off diaphragm 46 may be utilized to release the comparatively large force of the coiled compression spring tending to force the valve 24 into closed position. The valve supporting pivot 33 is mounted in a pair of slots 61 provided in each of the side walls of the linkage cavity, so that when not maintained by mechanism hereinafter described the forward end of the valve operating lever 32 may snap outwardly responsive to the outward force of the valve stem, so that the valve 24 will assume closed position notwithstanding the fact that the rear end of the valve operating lever 32 is held in engagement with the valve body 10.

The supporting pivot 33 is maintained in position at the upper extremity of the slots 61 by a toggle joint comprising a link 62 extending between the supporting pivot 33 and the connecting pivot pin 79 of the toggle. The connecting pivot pin 79 serves to join the link 78 with a pair of links 75 pivoted on the stationary anchor pivot 74. A coil spring 76 is wound around the stationary pivot 74 and has its opposite ends anchored to the handle guard and the links 75, respectively, in order to urge the links 75 in a counter-clockwise direction around the anchor pivot 74 so that, unless forces of greater magnitude act on the toggle joint, the spring will draw the links 75, connecting pivot 79, link 78, and supporting pin 33 to latched position. In this connection, it will be pointed out that the link 78 is curved at a point intermediate the pivots 33 and 79 so that the three pivots 74, 79 and 33 may approach a dead center position, and link 78 will engage the pivot 74 to serve as a limiting stop. It will also be noted that the link 78 is provided with a dog 86 at its upper end which will be engaged by the latch surface 88 milled on the pressure reduction lever 82 pivoted on the cross pin 83. The opposite end of the lever 82 is pivoted on the diaphragm post 49 by means of the pin 73. The lever 82 includes a toggle-actuator portion 84 extending at right angles to the length of the lever and arranged to bear against the toggle joint and urge the connecting pivot toward released position.

It will be noted that the latching dog 88 is positioned at a point less than half of the distance between the pivot 83 and the diaphragm post pivot 73 so that the movement of the diaphragm has a decided mechanical advantage over the latching surfaces, and a very small effort on the diaphragm is sufficient to overcome the friction incident to the engagement of the latch.

As the latching surfaces 82—86 release, the actuator portion 84 of the bell crank lever 82 will move to the right to engage the toggle joint and force it toward released position, whereupon the load of the valve spring will act through the stem of the valve 24 to snap it downwardly into fully released position.

The applicant is aware that various types of toggle release mechanisms have been widely used before this application, but so far as he is informed, these have been either the stable toggle type, in which the toggle joint reaches or passes dead center positions, or the unstable latched toggle type, in which the toggle has a substantial bias toward released position, and is held by a latch. It is submitted, however, that the use of the mechanism disclosed in the present application results in marked and unobvious advantages not heretofore known in the art.

In the stable toggle type, when the toggle linkage is used without any latch, it is necessary to arrange the structures so that the toggle lies slightly beyond the dead center, in order to prevent any possibility of accidental release. With the unstable latched toggle type, the pivots of the toggle joint are arranged to reach their limit of movement a considerable distance short of the dead center position, so that the force acting to bias the toggle will be substantial, and the friction inherent in the toggle joint cannot under any circumstances prevent release of the toggle when the latch is released.

In the first of these, a very substantial force is required to break the toggle (move the connecting pivot across center) if the load in the links is large. In the second, if the load is large, the friction between the latching surfaces will be proportionately great, and a very substantial force will be required to overcome the friction and disengage the latch.

Neither of these prior types of releases will function satisfactorily if the toggle links lie in what may be termed a "critical" position. This "critical" position may be defined as a position just short of dead-center, in which a very slight bias will exist tending to urge the pivots to released position. The slight biasing force in this position is insufficient to insure positive action in the latched toggle type of structure. On the other hand, the toggle links in this critical position are not sufficiently stable to prevent the possibility of accidental release if the latch is not used.

The structure disclosed in this application permits satisfactory operation of the device with the toggle in a critical position and, since the toggle is very sensitive in such a position, the force required for dependable actuation of the release is extremely small. That is, when the toggle is positioned short of dead center, it will be subject to a small biasing force which, while not sufficient to be depended upon to effect release in and of itself, renders it very sensitive to the releasing force applied thereto by the actuator 84.

The construction and arrangement is such that the very slight bias of the toggle joint toward its broken position will be insufficient to cause any perceptible amount of friction between the latching surfaces which would tend to resist the releasing action of the latch and at the same time when the latch is released, if the bias is insufficient to cause actuation of the toggle, it will be obvious that only a very small force by the actuator will be sufficient to break the toggle and snap it into released position.

The utility of this form of the device is particularly useful when the toggle is set in critical position, since it permits the release of the toggle with a smaller actuating force than would otherwise be required. It is also advantageous in that it will accommodate itself to wide tolerances in manufacture and assembly and will function satisfactorily. Even in the event that the toggle joint is bent or improperly assembled to the point that it is beyond dead center, or not closely approaching the dead center position, it will still be capable of operation.

It will also be apparent that by following the teachings of the present invention, a heavy load may be positively controlled by a simple, rugged release mechanism, not apt to be subject to mechanical failures, and not including any unnecessarily complex structures.

It will also be seen that the mechanical movement here disclosed is well suited to the control of relatively large forces responsive to controlling forces of minute magnitude, since the force acting on the supporting pivot 33 is primarily maintained by the toggle joint but is controlled by the latch and the toggle actuator. Thus, the relatively small forces exerted by the diaphragm are entirely effective to release the far greater magnitude of the load exerted by the valve spring, with the result that the structure may be arranged to positively respond to the small differences in pressure in the cavity 45.

Further, by following the teachings of this invention, it is possible to provide a novel mechanical movement whereby great forces may be effectively maintained without danger of accidental release, and yet may be positively and efficiently released in response to forces of minute magnitude as compared to the magnitude of the load.

While I have shown and described the preferred embodiment of the present invention, I am aware that it is subject to numerous modifications and variations without departing from the invention spirit and I therefore wish to be limited only by the scope of the appended claims.

Having thus described my invention, I claim:

1. A latching structure adapted to release a relatively great force in response to a force of far less magnitude comprising a toggle joint arranged to assume a critical position, said toggle including a pair of links and a connecting pivot interconnecting said links to each other, means for moving said toggle joint toward critical position, a latch mechanism to engage the toggle joint to maintain the toggle links in critical position, a toggle actuating element arranged to exert force against the toggle joint and urge the toggle joint toward released position, and means for concurrently releasing the latch and operating the toggle actuating element to unlatch the toggle joint and urge it toward released position.

2. A latching structure adapted to release a relatively great force in response to a force of far less magnitude comprising a toggle joint arranged to assume a critical position, said toggle including a stationary anchor pivot, a movable supporting pivot, and a shiftable connecting pivot; a pair of links interconnecting said anchor and supporting pivots, and being interconnected to each other by the shiftable connecting pivot, a latch mechanism to engage the toggle joint and maintain the toggle links in position, a toggle actuating element arranged to exert force against the toggle joint and urge the toggle joint toward released position, and means for concurrently releasing the latch and operating the toggle actuating element to unlatch the toggle joint and urge it toward released position.

3. A latching structure adapted to release a relatively great force in response to a force of far less magnitude comprising a toggle joint arranged to assume a critical position, said toggle including a stationary anchor pivot, a movable supporting pivot, and a shiftable connecting pivot; a pair of links interconnecting said anchor and supporting pivots, and being interconnected to each other by the shiftable connecting pivot, means for moving said toggle joint toward dead center position, a latch mechanism to engage the toggle joint at a point adjacent the center pivot and to maintain the toggle links in position, a toggle actuating element arranged to exert force against the center of said toggle joint and urge the toggle joint toward released position, and means for concurrently releasing the latch and operating the toggle actuating element to unlatch the toggle joint and urge it toward released position.

4. A latching structure adapted to release a relatively great force in response to a force of far less magnitude comprising a toggle joint, said toggle including a stationary anchor pivot, a movable supporting pivot, and a shiftable connecting pivot; a pair of links interconnecting said anchor and supporting pivots, and being interconnected to each other by the shiftable connecting pivot, a latch mechanism to engage the toggle joint at a point adjacent the connecting pivot and to maintain the toggle links in predetermined position, a toggle actuating element arranged to exert force against the said toggle joint and urge the toggle joint toward released position, and means for concurrently releasing the latch and operating the toggle actuating element to unlatch the toggle joint and urge it toward released position.

5. A latching structure adapted to release a relatively great force in response to a force of far less magnitude comprising a toggle joint, a latch mechanism to engage the toggle joint and to maintain the toggle links in predetermined position, a toggle actuating element arranged to exert force against the toggle joint and urge the toggle joint toward released position, and means for concurrently releasing the latch and operating the toggle actuating element to unlatch the toggle joint and urge it toward released position.

6. As a latching device, a toggle joint comprising a relatively stationary anchor pivot, a relatively shiftable supporting pivot and a connecting pivot, a link of the toggle extending between the anchor pivot and the connecting pivot and adapted for arcuate movement around the anchor pivot whereby the connecting pivot will be guided in an arc having the axis of the pivot as its center; a second toggle link extending between the shiftable supporting pivot and the connecting pivot, the arrangement being such that the toggle links will cooperate to allow movement of the supporting pivot and connecting pivot so all of the pivots of the toggle may approach dead center position, a latching device associated with the connecting pivot of the toggle and arranged to prevent movement of the center pivot of the toggle, and a toggle actuator adapted to force the connecting pivot of the toggle in a lateral direction to cause the connecting pivot of the toggle to move toward released position, and means to concurrently release the aforementioned latch and operate the toggle actuator to actively urge the toggle to disengaged position, said means including a pivoted lever.

7. As a latching device, a toggle joint comprising a relatively stationary anchor pivot, a relatively shiftable supporting pivot and a connecting pivot, a link of the toggle extending between the anchor pivot and the connecting pivot and adapted for arcuate movement around the anchor pivot whereby the connecting pivot will be guided in an arc having the axis of the pivot as its center; a second toggle link extending between the shiftable supporting pivot and the connecting pivot, said second toggle link being of a length greater than the first mentioned toggle link, the arrangement being such that the toggle links will cooperate to allow movement of the supporting pivot and connecting pivot so all of the pivots of the toggle may approach dead center position, a latching device associated with the toggle and arranged to maintain the pivots of the toggle in predetermined position and to prevent movement of the connecting pivot of the toggle in one direction; limiting stops to prevent the movement of the center of the pivot of the toggle in the opposite direction and a toggle actuator adapted to exert force in a lateral direction against the toggle joint to cause the connecting pivot of the toggle to move towards released position; and means to concurrently release the aforementioned latch and operate the toggle actuator to effectively urge the toggle to disengaged position.

8. As a latching device, a toggle joint comprising a relatively stationary anchor pivot, a relatively shiftable supporting pivot and a connecting pivot, a link of the toggle extending between the anchor pivot and the connecting pivot and adapted for arcuate movement around the anchor pivot whereby the connecting pivot will be guided in an arc having the axis of the pivot as its center; a second toggle link extending between the shiftable supporting pivot and the connecting pivot, said second toggle link being of a length greater than the first mentioned toggle link, the arrangement being such that the toggle links will cooperate to allow movement of the supporting pivot and connecting pivot so all of the pivots of the toggle may approach dead center position, a latching device associated with the toggle and arranged to maintain the pivots of the toggle in predetermined position and to prevent movement of the connecting pivot of the toggle in one direction; limiting stops to prevent the movement of the center of the pivot of the toggle in the opposite direction, and a toggle actuator adapted to exert force in a lateral direction against the toggle joint to cause the connecting pivot of the toggle to move toward released position, and means to concurrently release the aforementioned latch and operate the toggle actuator to effectively urge the toggle to disengaged position, said means including a pivoted lever having a latch notch adapted to move in one direction to release the latch and an actuating arm adapted to move in a direction normal to the movement of the latch notch to urge the toggle toward released position.

9. As a latching device, a toggle joint comprising a relatively stationary anchor pivot, a relatively shiftable supporting pivot and a connecting pivot, a link of the toggle extending between the anchor pivot and the connecting pivot and adapted for arcuate movement around the anchor pivot whereby the connecting pivot will be guided in an arc having the axis of the pivot as its center; a second toggle link extending between the shiftable supporting pivot and the connecting pivot, said second toggle link being of a length greater than the first mentioned toggle link, the arrangement being such that the toggle links will cooperate to allow movement of the supporting pivot and connecting pivot so all of the pivots of the toggle may move into critical position in which the friction inherent in the pivots of the toggle will be sufficiently large to overcome any biasing force exerted in a direction lateral to the plane of the pivot axes, a latching device associated with the connecting pivot of the toggle and arranged to maintain the pivots of the toggle in critical position, limiting stops to prevent the movement of the center of the pivot of the toggle toward dead-center position, and a toggle actuator adapted to exert force in a lateral direction against the center of the toggle joint to cause the connecting pivot of the toggle to move away from critical position, and means to concurrently release the aforementioned latch and operate the toggle actuator to actively urge the toggle to disengaged position.

10. As a latching device, a toggle joint comprising a relatively stationary anchor pivot, a relatively shiftable supporting pivot and a connecting pivot, a link of the toggle extending between the anchor pivot and the connecting pivot and adapted for arcuate movement around the anchor pivot whereby the connecting pivot will be guided in an arc having the axis of the pivot as its center; a second toggle link extending between the shiftable supporting pivot and the connecting pivot, said second toggle link being of a length greater than the first mentioned toggle link, the arrangement being such that the toggle links will cooperate to allow movement of the supporting pivot and connecting pivot so all of the pivots of the toggle may move into critical position in which the friction inherent in the pivots of the toggle will be sufficiently large to overcome any biasing force exerted in a direction lateral to the plane of the pivot axes, a latching device associated with the connecting pivot of the toggle and arranged to maintain the pivots of the toggle in critical position, limiting stops to prevent the movement of the center of the pivot of the toggle toward dead-center position, and a toggle actuator adapted to exert force in a lateral direction against the toggle joint to cause the connecting pivot of the toggle to move away from critical position, and means to concurrently release the aforementioned latch and operate the toggle actuator to actively urge the toggle to disengaged position; said means including a pivoted lever having a latch notch adapted to move in one direction to release the latch and an actuating arm adapted to move in a direction normal to the movement of the latch notch to urge the toggle toward released position.

LOWELL F. HAMMAND.